United States Patent
Poudrai et al.

(10) Patent No.: US 9,728,092 B2
(45) Date of Patent: Aug. 8, 2017

(54) METHOD AND A DEVICE FOR DETERMINING THE WIND SPEED TO BE TAKEN INTO ACCOUNT IN ORDER TO OPTIMIZE THE TAKEOFF WEIGHT OF AN AIRCRAFT

(71) Applicant: AIRBUS HELICOPTERS, Marignane (FR)

(72) Inventors: Etienne Poudrai, Marseilles (FR); Nicolas Certain, Aix En Provence (FR); Bernard Spinosi, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 65 days.

(21) Appl. No.: 14/995,285

(22) Filed: Jan. 14, 2016

(65) Prior Publication Data
US 2016/0210869 A1    Jul. 21, 2016

(30) Foreign Application Priority Data
Jan. 15, 2015   (FR) ..................................... 15 00077

(51) Int. Cl.
*G08G 5/00*   (2006.01)
*B64C 27/04*   (2006.01)
(Continued)

(52) U.S. Cl.
CPC .......... *G08G 5/0065* (2013.01); *B64C 27/04* (2013.01); *B64D 43/02* (2013.01); *G01P 5/26* (2013.01);
(Continued)

(58) Field of Classification Search
CPC ....... G08G 5/0065; B64C 27/04; B64D 43/02
See application file for complete search history.

(56) References Cited

U.S. PATENT DOCUMENTS

| 4,031,756 A | 6/1977 | Rotier et al. |
| 9,234,909 B2 | 1/2016 | Meulle et al. |

(Continued)

FOREIGN PATENT DOCUMENTS

| EP | 2799890 | 11/2014 |
| FR | 2988851 | 10/2013 |

(Continued)

OTHER PUBLICATIONS

French Search Report for French Application No. FR 1500077, Completed by the French Patent Office on Aug. 11, 2015, 8 Pages.

*Primary Examiner* — Basil T Jos
(74) *Attorney, Agent, or Firm* — Brooks Kushman P.C.

(57) ABSTRACT

A method of determining the speed of the wind to be taken into account for determining a maximum authorized takeoff weight of an aircraft. A measured speed $TAS_{mes}$ of the local wind is calculated from at least one current speed $TAS_{inst}$ of the local wind and an observed speed $TAS_{obs}$ of the local wind on the basis of weather observations and on the basis of a heading value. The measured speed $TAS_{mes}$ is compared with the observed speed $TAS_{obs}$ in order to determine a calculated speed $TAS_{perfo}$ of the local wind while also making use of at least one instability criterion of the local wind as supplied by the weather observations and weather forecasts. The calculated speed $TAS_{perfo}$ is then for taking into account in order to optimize the maximize authorized takeoff weight of the aircraft.

22 Claims, 1 Drawing Sheet

(51) Int. Cl.
*B64D 43/02* (2006.01)
*G01P 5/26* (2006.01)
*G01P 21/02* (2006.01)

(52) U.S. Cl.
CPC .......... *G01P 21/025* (2013.01); *G08G 5/0091* (2013.01)

(56) References Cited

U.S. PATENT DOCUMENTS

| | | | |
|---|---|---|---|
| 2007/0124034 A1* | 5/2007 | Pitard | G05D 1/0083 701/15 |
| 2010/0128252 A1 | 5/2010 | Perrie et al. | |
| 2015/0052994 A1 | 2/2015 | Dupont De Dinechin | |
| 2015/0323559 A1 | 11/2015 | Rondeau et al. | |

FOREIGN PATENT DOCUMENTS

| | | |
|---|---|---|
| WO | 9964942 | 12/1999 |
| WO | 2014102175 | 7/2014 |

* cited by examiner

METHOD AND A DEVICE FOR DETERMINING THE WIND SPEED TO BE TAKEN INTO ACCOUNT IN ORDER TO OPTIMIZE THE TAKEOFF WEIGHT OF AN AIRCRAFT

CROSS REFERENCE TO RELATED APPLICATION

This application claims priority to French patent application No. FR 15 00077 filed on Jan. 15, 2015, the disclosure of which is incorporated in its entirety by reference herein.

BACKGROUND OF THE INVENTION (1) Field of the Invention

The present invention lies in the field of optimizing the performance of an aircraft, and more particularly of a rotary wing aircraft on takeoff.

The present invention relates to a method of determining the wind speed to be taken into account in order to optimize the takeoff weight of an aircraft, and also to a device for performing the method.

(2) Description of Related Art

The ability to optimize the performance of an aircraft is a crucial element for operators of any aircraft. The performance of an aircraft is strongly influenced by the speed of the aircraft relative to the surrounding air. For convenience, the term "air speed" is used below to designate the speed of an aircraft relative to the air. This speed is often referred to as "true" air speed or "TAS".

Specifically, the power that is consumed by an aircraft, and in particular by a rotary wing aircraft, depends on its air speed, regardless of the stage of flight being performed by the aircraft. By way of example, Document EP 1 078 308 describes a limiting envelope for admissible air speeds of an aircraft that is converted into a limiting envelope of speeds relative to the ground by taking account of speed and wind direction.

The maximum weight of an aircraft, and in particular its takeoff weight is also a function of the air speed of the aircraft. In addition, in the particular situation of an aircraft taking off at zero speed relative to the ground, such as a rotary wing aircraft, the air speed of the aircraft corresponds to the wind speed at the aircraft.

Thus, the maximum takeoff weight of a rotary wing aircraft is defined firstly by the technical characteristics of the aircraft and secondly by the wind speed, and more particularly the speed of the longitudinal wind to which the aircraft is subjected. The term "longitudinal wind" is used to mean the projection of the wind onto the longitudinal direction of the aircraft. An aircraft has three preferred directions: a longitudinal direction, a transverse direction, and a vertical direction, thereby defining a local rectangular reference frame tied to the aircraft.

For example, for a rotary wing aircraft flying at high air speeds, typically faster than the optimum climb speed $V_{OM}$ of the aircraft, when the speed of the head wind to which the aircraft is subjected increases, the power needed by the aircraft to perform level flight also increases. This increase in air speed gives rise in particular to an increase in the aerodynamic drag to which the aircraft is subjected, thus requiring an increase in the power the aircraft needs to deliver.

In contrast, at low air speed, typically speeds that are less than or equal to the optimum climb speed $V_{OM}$ of the aircraft, when the head wind to which the aircraft is subjected increases, the power needed to enable the aircraft to perform level flight decreases. In this range of air speeds, the increase in air speed serves to generate an increase in the lift of the main rotor that is greater than the increase in the aerodynamic drag to which the aircraft is subjected, and it is thus favorable to flying the aircraft.

For an aircraft having a power plant delivering a given power, the maximum takeoff weight of the aircraft can vary depending on the speed of the head wind to which the aircraft is subjected during takeoff.

Aircraft are conventionally provided with an air data computer (ADC) that provides the pilot with an indication of the aircraft air speed. This air speed is equal and opposite to the wind speed when the aircraft is on the ground and stationary, in particular while waiting to take off. Such an aircraft data computer conventionally makes use of at least one Pitot tube measuring the total air pressure in the longitudinal direction of the aircraft, and a measurement inlet for measuring the static pressure of the air surrounding the aircraft.

Under such circumstances and by way of example, an air data computer having two measurement devices positioned in the longitudinal and transverse directions of the aircraft can supply the pilot of the aircraft with indications about the air speeds of the aircraft along a longitudinal component and along a transverse component, and thus an indication of the magnitude and an indication of the direction of the wind while the aircraft is stationary on the ground.

Nevertheless, the air speed supplied by a conventional air data computer is not always accurate and reliable.

That type of instrument is not capable of measuring wind speeds that are low of less than 30 knots (kt), with good stability and good accuracy. Furthermore, that type of instrument measures air speed in one direction only, such that the measurements for the magnitude and the direction of the wind when the aircraft is stationary on the ground can be inaccurate.

Furthermore, rotary wing aircraft have at least one main rotor that is driven in rotation about an axis that is substantially vertical and that serves to provide the aircraft with lift, and possibly also with propulsion. In addition, such rotary wing aircraft may also be provided with an anti-torque device comprising at least one auxiliary rotor driven about an axis of rotation that is substantially horizontal, such as a tail rotor.

Consequently, each main rotor and possibly a tail rotor produce respective washes resulting from their own rotation that can disturb the air stream surrounding the aircraft in the vicinity of its air pressure inlets. Measuring the air speed of the aircraft can be disturbed by the presence of each main rotor and possibly of a tail rotor, which effect can become even greater when the aircraft is stationary on the ground.

Consequently, measurements provided by conventional air data computers on board a rotary wing aircraft do not generally make it possible to obtain a measurement of wind speed that is accurate and of integrity, when the aircraft is stationary on the ground.

Furthermore, an aircraft's maximum authorized takeoff weight is considered to be a safety characteristic of the aircraft and the way it is determined is governed by regulations and requirements defined by various organizations such as the European Aviation Safety Agency (EASA) for Europe, for example.

In particular, in the EASA requirements, if a measurement of the head wind to which the aircraft is subjected is not available in a manner that is sufficiently accurate and of sufficient integrity, then a safety margin is applied to the speed of the head wind that is used for determining the maximum authorized takeoff weight of an aircraft. The safety margin is greater than or equal to 50% of the speed of the head wind measured in the proximity of the aircraft.

In practice, this safety margin is generally equal to 50% of the speed of the head wind measured in the proximity of the aircraft, the longitudinal wind speed that is used for determining the maximum authorized takeoff weight of an aircraft then being equal to that speed of the head wind observed in the proximity of the aircraft when divided by two. That observed speed of the head wind is generally taken from a weather observation report for the aerodrome from which the aircraft is to take off, which report is established prior to the aircraft taking off and is issued in regular manner by the aerodrome.

That observed head wind speed is measured on the runway or on the aerodrome from which the aircraft is to take off but not necessarily at the aircraft itself. Furthermore, that observed head wind speed is not measured at the time the aircraft takes off, but rather beforehand, and generally at regular intervals. By way of example, that observed head wind speed may have been measured more than 30 minutes (min) before the aircraft takes off.

Finally, when taking off from a non-prepared area, it can happen that mean wind information is not available for that area, but is available for an area that is some distance away.

Furthermore, when no mean wind measurement is available, the local wind speed is considered to be zero.

Such a measurement of the observed head wind does not correspond exactly to the conditions that are actually encountered by the aircraft when it takes off. Nevertheless, that 50% safety margin represents a solution that is reliable and safe, satisfying the requirements of regulations, in particular for rotary wing aircraft.

Nevertheless, nowadays there exist bidirectional anemometers and multidirectional anemometers that provide air speed measurements that are more reliable and that can also be of integrity. In particular, such bidirectional anemometers make it possible to define a longitudinal speed and a transverse speed for the air speed of the aircraft. Multidirectional anemometers are capable of defining the magnitude of the air speed and its direction in a local reference frame tied to the aircraft. Furthermore, such bidirectional and multidirectional anemometers are also capable of measuring low air speeds, down to values that are zero or negative.

For example, optical anemometers are known, such as light detection and ranging (LIDAR) anemometers that can be used for measuring the air speed of an aircraft by sequentially transmitting and receiving a laser light beam at a given pulse rate.

Document WO 2014/102175 thus describes a method and a system for determining the speed of an aircraft relative to air by using a laser anemometer device.

Furthermore, Document US 2010/0128252 describes a method and a system for optimizing the orientation of a laser anemometer.

Ultrasound anemometers also exist, such as the anemometer described in Document U.S. Pat. No. 4,031,756, that enable the air speed of an aircraft to be measured by transmitting and receiving ultrasound waves.

Furthermore, Document EP 2 799 890 describes a method and a system for determining the speed of an aircraft relative to the air on the basis in particular of the positions of other aircraft situated in its proximity.

Finally, Document FR 2 988 851 describes a method and a system for determining a credibility status for measurements from an incidence sensor of an aircraft.

BRIEF SUMMARY OF THE INVENTION

An object of the present invention is thus to propose a method and a device making it possible to overcome the above-mentioned limitations, thereby reducing the safety margin used in order to determine the maximum authorized takeoff weight of the aircraft depending on the speed of head wind to which the aircraft is subjected while taking off. The invention seeks to determine this speed of the head wind to which the aircraft is really subjected in a manner that is accurate and of integrity, and to take it into account so as to optimize the maximum authorized takeoff weight of the aircraft, thereby improving the performance of the aircraft on takeoff and in particular improving its payload without degrading the safety in flight of the aircraft.

The principle of the invention consists in providing measurements of the speed of the wind to which the aircraft is subjected that are sufficiently accurate and of sufficient integrity by using one or more multidirectional anemometers on board the aircraft, and then in consolidating these wind measurements with weather forecast and weather observation information.

According to the invention, a method of determining the wind speed to be taken into account for determining the maximum authorized takeoff weight of an aircraft is for use by an aircraft, and more particularly by a rotary wing aircraft. Such an aircraft includes at least multidirectional anemometer means; weather observation and weather forecast information receiver means, consolidation means for consolidating the various measurements, and display means.

The method is remarkable in that it comprises the following steps:

determining a heading value in a terrestrial reference frame;

measuring at least one current speed value $TAS_{inst}$ of the local wind at the aircraft in a predefined direction, the predefined direction being a direction corresponding to the heading value;

receiving weather observation information and weather forecast information for the area in which the aircraft is situated or for a nearby area;

calculating a measured speed $TAS_{mes}$ of the local wind in the predefined direction from at least one current speed value $TAS_{inst}$ of the local wind;

calculating an observed speed $TAS_{obs}$ of the local wind in the predefined direction from the weather observation information and the heading value;

comparing the measured speed $TAS_{mes}$ and the observed speed $TAS_{obs}$ of the local wind;

determining a calculated speed $TAS_{perfo}$ of the local wind for taking into account when determining the authorized maximum takeoff weight of the aircraft in the predefined direction; and displaying the calculated speed $TAS_{perfo}$ of the local wind on display means.

The method is for an aircraft and more particularly a rotary wing aircraft, the aircraft being stationary, e.g. on the ground or on a takeoff platform that is deemed to be stationary, waiting to take off.

The heading value characterizes a predefined direction in a terrestrial reference frame while the aircraft is taking off.

Preferably, the heading value is equal to the instantaneous heading of the aircraft. Under such circumstances, the predefined direction is a direction in which the aircraft extends longitudinally, which direction is a preferred direction of the aircraft.

An aircraft has three preferred directions, a longitudinally extending direction of the aircraft being identified as an axis X extending from the front to the rear of the aircraft, a vertically extending direction of the aircraft identified as an axis Z extending from the top to the bottom of the aircraft, and a transversely extending direction identified as an axis Y extending between the sides of the aircraft. The axes X, Y, and Z thus define a local rectangular reference frame (X, Y, Z) identifying the travel directions of the aircraft, the reference frame (X, Y, Z) being tied to the aircraft.

Furthermore, the longitudinally extending direction corresponds in general to the roll axis of the aircraft, the transversely extending direction to its pitching axis, and the vertically extending direction to its yaw axis. It should be recalled that for the typical directions in which the axes of the aircraft extend, the concepts of "horizontal", "vertical", and "transverse" are relative concepts conventionally taken into consideration relative to the position of the aircraft when on the ground.

Consequently, the current speed value $TAS_{inst}$ of the local wind in the predefined direction actually corresponds to the longitudinal speed of the local wind, i.e. in the longitudinally extending direction of the aircraft waiting to take off. Likewise, the measured speed $TAS_{mes}$, the observed speed $TAS_{obs}$, and the calculated speed $TAS_{perfo}$ also correspond to longitudinal speeds of the local wind relative to the aircraft waiting to take off.

The heading value may be determined by instrumentation on board the aircraft, or by a pilot, or indeed by some other crew member of the aircraft. In addition to an emergency compass, the aircraft may include at least heading determination means such as an attitude and heading reference system (AHRS) device. Such a device serves in particular to determine the instantaneous gyromagnetic heading and attitude of the aircraft. The attitude characterizes the angular positions of the aircraft about its roll, pitching, and yaw axes. This heading value is then determined automatically by at least heading determination means and it is equal to the instantaneous heading of the aircraft.

Nevertheless, the heading value may be different from the instantaneous heading of the aircraft and may correspond to a takeoff heading that the aircraft takes up very quickly after taking off, for example it is possible for the takeoff heading to be imposed by the environment in the area from which the aircraft is taking off. Under such circumstances, the heading value is defined manually by a pilot or by some other member of the aircraft crew.

Under such circumstances, the current speed value $TAS_{inst}$ of the local wind in the predefined direction does not correspond to a longitudinal speed of the local wind relative to the aircraft waiting to take off, and the same applies to the measured speed $TAS_{mes}$, the observed speed $TAS_{obs}$, and the calculated speed $TAS_{perfo}$.

This current speed value $TAS_{inst}$ of the local wind in the predefined direction corresponds to the longitudinal speed of the local wind relative to the aircraft after takeoff and once the aircraft has adopted a heading having this heading value. Likewise, the measured speed $TAS_{mes}$, the observed speed $TAS_{obs}$, and the calculated speed $TAS_{perfo}$ correspond to longitudinal speeds of the local wind relative to the aircraft after takeoff as soon as it has adopted the heading corresponding to this heading value.

Such an aircraft includes at least multidirectional anemometer means capable of measuring the speed of the local wind, the local wind being taken into consideration at the aircraft, regardless of the value of its speed, and in particular at low wind speeds. This local wind speed may be resolved into a longitudinal component in the longitudinally extending direction of the aircraft and a transverse component in the transversely extending direction of the aircraft. As described above, the longitudinal component of the wind has an influence on the performance of the aircraft and in particular on its maximum authorized takeoff weight.

Anemometer means may also include a unidirectional anemometer positioned in the longitudinally extending direction of the aircraft. Such a unidirectional anemometer thus serves to measure the air speed of the aircraft in its longitudinal direction only. Consequently, when the aircraft is stationary, such a unidirectional anemometer serves to measure only the longitudinal component of the local wind speed.

Such a unidirectional anemometer that supplies only the longitudinal speed of the local wind when the aircraft is waiting to take off can then be used by the method of the invention only when the heading value is equal to the instantaneous heading of the aircraft.

Preferably, the anemometer means comprise an anemometer that is bidirectional or indeed multidirectional, which can then be used regardless of this heading value.

A bidirectional anemometer fitted to an aircraft makes it possible to measure the speed of the wind in two directions that are generally the longitudinally extending direction and the transversely extending direction of the aircraft. Such a bidirectional anemometer thus measures the longitudinal component and the transverse component of the speed of the local wind when the aircraft is stationary on the ground.

In addition, a difference may exist between the two real measurement directions of the bidirectional anemometer installed on the aircraft and the longitudinally extending and transversely extending directions of the aircraft. This difference is easily quantified by testing. Advantageously, the wind speeds measured in the two real measurement directions can then be corrected as a function of the difference so as to supply the real longitudinal speed and the real transverse speed of the local wind in the preferred directions of the aircraft.

A multidirectional anemometer makes it possible to define both the magnitude of the local wind speed and also its direction in a reference frame tied to the multidirectional anemometer when the aircraft is stationary. In addition, the multidirectional anemometer is installed on the aircraft and is thus referenced relative to the aircraft. A relationship exists between the reference frame tied to the anemometer and the preferred directions of the aircraft. Consequently, such a multidirectional anemometer installed on the aircraft provides the longitudinal component and the transverse component of the local wind speed along the preferred directions of the aircraft.

As a result, the speed of the local wind measured by a bidirectional or multidirectional anemometer is known in a plane associated with the aircraft and defined by the aircraft's longitudinal and transverse directions.

If the heading value is equal to the instantaneous heading of the aircraft, the current speed value $TAS_{inst}$ of the local wind is equal to the measured longitudinal component of the local wind speed.

Conversely, if the heading value is other than the instantaneous heading of the aircraft, the current speed value $TAS_{inst}$ of the local wind speed is equal to a projection of the measured local wind speed onto the predefined direction.

This predefined direction must then be characterized relative to the longitudinal direction of the aircraft in order to determine this current speed value $TAS_{inst}$. This predefined direction may be characterized by a relative bearing, i.e. the angle between the predefined direction and the longitudinal direction of the aircraft.

Specifically, the instantaneous heading of the aircraft corresponding to the longitudinal direction of the aircraft must also be determined in order to calculate this bearing of the predefined direction relative to the longitudinally extending direction of the aircraft.

As specified above, the instantaneous heading of the aircraft may be determined by a pilot or some other member of the aircraft crew, e.g. using a compass. The instantaneous heading of the aircraft may also be determined automatically at least by heading determination means of the aircraft.

Furthermore, in the context of the method of the invention, any anemometer means can also measure longitudinal wind speeds that are low, down to values that are zero or negative, and can thus be operational while the aircraft is taking off.

In order to ensure a sufficient level of safety for the operation of the method of the invention, a predefined failure rate and a predetermined error margin are associated with each measurement of the local wind speed supplied by any given anemometer means.

The failure rate is the number of undetected false current speed values $TAS_{inst}$ that might be supplied by any given anemometer means over a period of one hour. A current speed value $TAS_{inst}$ is considered to be false when its difference from the real speed of the local wind is greater than the predetermined error margin. The failure rate and the predetermined error margin thus characterize the accuracy and the integrity of the current speed value $TAS_{inst}$. The predetermined error margin takes account of all of the sources of inaccuracy, such as for example accuracy errors associated directly with the anemometer means or errors associated with incorporating the anemometer means on board the aircraft.

Furthermore, the predefined failure rate may be intrinsic to the anemometer means that make it possible only to obtain a speed value $TAS_{inst}$ of the local wind speed that is accurate and of integrity.

The use of a plurality of anemometer means also makes it possible to consolidate the measurements of the local wind speed by using conventional redundancy methods concerning these measurements and/or by monitoring and/or by testing consistency, thereby improving the integrity of the measurements so as to achieve the predefined failure rate. The various anemometer means thus together provide a current speed value $TAS_{inst}$ of the local wind speed that is accurate and of integrity.

Thus, depending on the method used for determining the wind speed for taking into account when determining the maximum authorized takeoff weight of an aircraft, it is possible to measure a current speed value $TAS_{inst}$ of the local wind speed at the aircraft that is accurate and of integrity. This current speed value $TAS_{inst}$ characterizes the instantaneous speed of the local wind at the aircraft.

For example, the predetermined error margin is equal to 2 kt for the current speed value $TAS_{inst}$ of the local wind speed.

Anemometer means satisfying these criteria for failure rate and predetermined error margin and capable of measuring low wind speeds comprise for example an optical anemometer such as a LIDAR anemometer that uses a laser beam.

The aircraft also has receiver means for receiving weather observation and weather forecast information for the neighborhood of the aircraft. The aircraft can thus receive observation information about weather observations made in the area where the aircraft is to be found or in a nearby area over a past period of time. Likewise, the aircraft can receive forecast information about the weather forecast for the area in which the aircraft is to be found or for a nearby area over a future period of time.

This weather observation and weather forecast information includes in particular atmospheric data such as the speed and direction of the wind, atmospheric pressure, and temperature. This observation and forecast information may be similar in structure and may include atmospheric data that is equivalent and generally in the same format as observed in the past and as forecast for the future.

The weather observation information also contains the location and the period of the observation together with an issue date/time and optional additional remarks and data about observed changes, in particular specifying whether the wind presented a speed and/or a direction over the observation period that was or was not stable.

Likewise, the weather forecast information also contains the location, a period of validity, and an issue date/time together with optional additional remarks and data about expected changes, specifying in particular whether the speed and/or the direction of the wind over the period of validity is expected to be stable or not.

During the method of the invention for determining the wind speed to be taken into account for determining the maximum authorized takeoff weight of the aircraft, it is possible to receive weather observation information and weather forecast information for the area in which the aircraft is situated or for a nearby area.

Receiver means for receiving weather observation and weather forecast information may conventionally be constituted by a radio of the aircraft enabling the pilot or some other crew member of the aircraft to listen to a weather bulletin providing the weather observation and weather forecast information. The pilot or some other crew member needs to select the radio frequency that broadcasts the weather bulletin corresponding to the location of the aircraft. This radio frequency, which thus constitutes information about the location of the aircraft generally corresponds to the aerodrome where the aircraft, is situated or close to which it is situated. The pilot or some other crew member also verifies that the weather bulletin is indeed current. The term "current" should be understood as including both the date and the time.

Most aerodromes and airports generally provide a weather bulletin by radio.

Weather bulletins may also be provided via ground-to-air digital data transmission means.

Nowadays most aerodromes and airports provide weather observation and weather forecast reports in the form of digital data complying with an international code concerning its content and the format of the content.

A weather observation report in general use in aviation is known as the meteorological aerodrome report (METAR). The METAR report is formatted using an international code that has been developed by the members of the International Civil Aviation Organization (ICAO) and approved by the World Meteorological Organization (WMO). The METAR report provides a weather observation report for a given aerodrome. A METAR report may be issued once every half hour or once every hour, depending on the aerodrome.

Furthermore, in the event of particular observations such as changes in wind speed and/or direction, in particular, a special report may be issued.

Likewise, there exists a weather forecast report known as the terminal aerodrome forecast (TAF). A TAF report uses a format similar to the format of a METAR report and provides a weather forecast that is valid for 6 hours (h) to 30 h for a given aerodrome. In the absence of such a TAF report, and in particular for aerodromes that are for local or recreational use, regional forecasts for aviation purposes can be used instead of such a TAF report. A TAF report provides in particular a wind prediction, specifically describing future trends. In particular, expected changes in the wind, whether in speed or direction, are described using defined flags such as "BECMG" for "becoming", "TEMPO" for "temporary", or "VRB" for "variable".

The TAF and METAR reports are thus structures that are similar and they include the following elements in particular:

a code corresponding to the name of the TAF/METAR report;

the ICAO code for the aerodrome corresponding to the TAF/METAR report;

the date/time of the observation or of the forecasts and a validity period if it is a TAF report;

the wind direction and speed;

horizontal visibility;

cloud cover;

atmospheric temperature and dew point;

atmospheric pressure at sea level; and optionally additional remarks and data, in particular when changes are expected.

The receiver means for receiving weather observations and forecasts preferably comprise a digital data receiver capable of receiving the METAR and TAF reports that are closest to the aircraft.

In the method of the invention, the observation information comes from a METAR report and the forecast information comes from a TAF report. Advantageously, the observation information and the forecast information come respectively from a METAR report and a TAF report in automatic manner by the method of the invention, without intervention on the part of a pilot or other crew member of the aircraft.

Furthermore, the aircraft may also include locating means such as a global navigation satellite system (GNSS) receiver. Thus locating means serve to receive information locating the aircraft in a terrestrial reference frame in order to define accurately the position of the aircraft. Furthermore, such locating means also make it possible to receive time information making it possible to define the current date/time accurately.

By using this location and time information, the method of the invention can select the weather observation information and the weather forecast information for use depending on the origin of the information and its issue date, in particular when the information comes respectively from a METAR report and from a TAF report.

The method of the invention may also verify that the weather observation and weather forecast information does indeed relate to the area in which the aircraft is situated or to a nearby area, and that the information available is the most recent relative to the current date/time.

The aircraft also has consolidation means, such consolation means possibly comprising at least one computer and storage means.

The storage means may store information such as the weather observation information and the weather forecast information together with data such as current speed values $TAS_{inst}$ of the local wind speed and each heading value. The storage means may also store instructions that the computer can perform while using the stored information and data.

During takeoff, it is important, or indeed essential for safety reasons, for the pilot to know the local wind speed in the longitudinally extending direction of the aircraft, and in particular to know the speed of the head wind or indeed the tail wind to which the aircraft is subjected. The current speed value $TAS_{inst}$ of the local wind speed in the predefined direction is known, as is the heading value in a terrestrial reference frame characterizing the predefined direction.

Thus, during the method of determining the wind speed for taking into account in order to determine the maximum authorized takeoff weight of an aircraft, it is possible to calculate a measured speed $TAS_{mes}$ of the local wind in the predefined direction from a single current speed value $TAS_{inst}$ of the local wind speed.

This measured speed $TAS_{mes}$ of the local wind is then equal to the current speed value $TAS_{inst}$ and thus corresponds to the measured instantaneous speed of the local wind in the predefined direction.

In order to take account of variations in the local wind over a predetermined duration, it is also possible to make use of the current speed values $TAS_{inst}$ as measured in the preceding direction over that predetermined duration. For this purpose, it is possible to calculate a mean measured speed $TAS_{moy}$ of the local wind in the predefined direction, constituted by the mean of the current speed values $TAS_{inst}$ of the local wind speed over the predetermined duration. The measured speed $TAS_{mes}$ of the local wind may then be equal to the mean measured speed $TAS_{moy}$, and thus correspond to a mean speed of the local wind in the predefined direction over the predetermined duration.

By way of example, the predetermined duration may be equal to 2 min.

This measured speed $TAS_{mes}$ of the local wind is said to be "measured" since it is the result of a calculation based on measured values of the wind speed at the aircraft.

Furthermore, and as mentioned above, the current speed values $TAS_{inst}$ of the local wind speed are measured with predetermined accuracy or error margin. The purpose of the method of the invention is to optimize the maximize authorized takeoff weight of the aircraft, and as mentioned above, this weight increases for increasing speed of the head wind during takeoff.

Consequently, in order to remain safe and avoid overestimating the local wind speed, and consequently overestimating the maximum authorized takeoff weight of the aircraft, it is then possible to correct each current speed value $TAS_{inst}$ of the local wind speed with this predetermined error margin. The current speed value $TAS_{inst}$ that is to be taken into account is thus equal to the measured current speed value $TAS_{inst}$ minus the predetermined error margin. For example, if the predetermined error margin is equal to 2 kt, then the current speed value $TAS_{inst}$ is equal to the measured current speed value $TAS_{inst}$ minus 2 kt.

During the procedure of determining the wind speed to be taken into account when determining the maximum authorized takeoff weight of an aircraft, it is also possible to calculate an observed speed $TAS_{obs}$ of the local wind. The weather observation information contains a mean observed speed of the local wind and a mean observed direction of the local wind in the proximity of the aircraft in a terrestrial reference frame. The weather observation information thus makes it possible to define a speed vector of the local wind in the terrestrial reference frame. The heading value characterizes the predefined direction in a terrestrial reference frame. By projecting this speed vector of the observed wind onto the predefined direction, it is then possible to calculate the observed speed $TAS_{obs}$ of the local wind in the predefined direction.

This observed speed $TAS_{obs}$ of the local wind is said to be "observed" since it is the result of a calculation based on a mean observed speed and a mean observed direction for the wind as contained in the weather observation information.

In order to obtain this mean observed speed of the local wind and this mean observed direction of the local wind, and providing the receiver is a digital data receiver, it is possible automatically to decode the digital data received by the receiver means for receiving the weather observation and the weather forecast information. Thereafter, still automatically and without intervention by a pilot or some other member of the crew of the aircraft, it is possible to extract the mean observed speed of the local wind and the mean observed direction of the local wind from the weather observation information.

In contrast, when the weather observation and weather forecast receiver means comprise a radio, a pilot or some other member of the aircraft crew needs to extract the mean observed speed of the local wind and the mean observed direction of the local wind from the weather observation information.

Consequently, during the method of the invention, it is possible to compare the measured speed $TAS_{mes}$ and the observed speed $TAS_{obs}$ for the local wind, and then to determine a calculated speed $TAS_{perfo}$ for the local wind that is to be taken into account when determining the maximum authorized takeoff weight for the predefined direction. The comparison criteria are the observed speed $TAS_{obs}$ of the local wind as calculated from the weather observation information, and the same observed speed $TAS_{obs}$ for the local wind when divided by two, which at present is the criterion as defined by regulations, and as a result is the criterion in the most widespread use for calculating the maximum authorized takeoff weight.

It is then possible to distinguish three main situations when the measured speed $TAS_{mes}$ and the observed speed $TAS_{obs}$ are positive, it being possible for the measured speed $TAS_{mes}$ to be greater than or equal to the observed speed $TAS_{obs}$, less than or equal to the observed speed divided by two, $TAS_{obs}/2$, or else to lie strictly between the observed speed $TAS_{obs}$ and the same observed speed when divided by two, $TAS_{obs}/2$. It is assumed that a local wind in the predefined direction is positive when the local wind provides at least some head wind relative to the aircraft. Conversely, a local wind in the predefined direction is taken to be negative when the local wind constitutes, at least in part, a tail wind relative to the aircraft.

Thus, when the measured speed $TAS_{mes}$ is greater than or equal to the observed speed $TAS_{obs}$, the calculated speed $TAS_{perfo}$ is equal to the observed speed $TAS_{obs}$. The measured speed $TAS_{mes}$ for the local wind at the aircraft is then greater than the observations made, and thus much greater than the observed speed divided by two, $TAS_{obs}/2$, as is conventionally used for determining the maximum authorized takeoff weight. As a result, it would be penalizing for the performance of the aircraft to use the observed speed divided by two, $TAS_{obs}/2$, in order to determine the maximum authorized takeoff weight of the aircraft when the measured speed $TAS_{mes}$ is greater than or equal to the observed speed $TAS_{obs}$.

Consequently, it is then possible to reduce the safety margin that is applied to the local wind speed. Advantageously, since the measured speed $TAS_{mes}$ of the local wind at the aircraft is greater than the observed speed $TAS_{obs}$, and in order to retain a safety margin relative to the measured speed, this observed speed $TAS_{obs}$ may be used for determining the maximum authorized takeoff weight.

In contrast, when the measured speed $TAS_{mes}$ lies strictly between the observed speed $TAS_{obs}$ and the same observed speed when divided by two, $TAS_{obs}/2$, i.e. when it is less than the observed speed $TAS_{obs}$ and greater than the observed speed divided by two, $TAS_{obs}/2$, the calculated speed $TAS_{perfo}$ is equal to the measured speed $TAS_{mes}$. Specifically, the measured speed $TAS_{mes}$ of the local wind is less than the observed speed $TAS_{obs}$, but greater than the observed speed divided by two, $TAS_{obs}/2$. Once more, it would then be penalizing to use the observed speed divided by two, $TAS_{obs}/2$, for the purpose of determining the maximum authorized takeoff weight while the measured speed $TAS_{mes}$ is greater than the observed speed divided by two, $TAS_{obs}/2$.

Consequently, it is possible once more to reduce the safety margin that is applied to the local wind speed. Advantageously, since the measured speed $TAS_{mes}$ of the local wind is greater than the observed speed divided by two, $TAS_{obs}/2$, while being less than the observed speed $TAS_{obs}$, the measured speed $TAS_{mes}$ can be used for the purpose of determining the maximum authorized takeoff weight.

Finally, when the measured speed $TAS_{mes}$ is less than or equal to the observed speed divided by two, $TAS_{obs}/2$, the calculated speed $TAS_{perfo}$ is equal to the observed speed divided by two, $TAS_{obs}/2$. Under such circumstances, when determining the maximum authorized takeoff weight of the aircraft, it would be penalizing for the performance of the aircraft to use the measured speed $TAS_{mes}$, since it is less than or equal to the observed speed divided by two, $TAS_{obs}/2$. Consequently, and in compliance with regulations, the observed speed divided by two, $TAS_{obs}/2$, can be used for determining the maximum authorized takeoff weight.

In addition, a fourth situation is possible when no measured speed $TAS_{mes}$ is supplied. The calculated speed $TAS_{perfo}$ is then equal to the observed speed divided by two, $TAS_{obs}/2$. It is possible for no measured speed $TAS_{mes}$ to be supplied as a result of a failure of the anemometer means.

Nevertheless, these situations are usable only if the observed local wind does not present any instability, and providing the forecast does not predict any such instability. Advantageously, a first instability criterion for the local wind may be extracted from the weather observation information and a second instability criterion for the local wind may be extracted from the weather forecast information.

Consequently, when the first instability criterion and/or the second instability criterion for the local wind indicate(s) instability in the observed local wind or a risk of instability in the forecast local wind, the calculated speed $TAS_{perfo}$ of the local wind is equal to the observed speed divided by two, $TAS_{obs}/2$. Thus, a safety margin of 50% is used in compliance with regulations.

In contrast, when the first instability criterion and the second instability criterion for the local wind do not indicate any instability, nor any risk of instability in the local wind, the above-described situations apply.

In contrast, when no observed speed $TAS_{obs}$ is available, the calculated speed $TAS_{perfo}$ is equal to the measured speed $TAS_{mes}$ divided by two. It can happen that no observed speed $TAS_{obs}$ is available, e.g. because no weather observation report has been received by the means for receiving the weather observation and weather forecast information.

Furthermore, if no measured speed $TAS_{mes}$ and no observed speed $TAS_{obs}$ is available, then the calculated speed $TAS_{perfo}$ is zero.

In addition, when the measured speed $TAS_{mes}$ and/or the observed speed $TAS_{obs}$ are negative, then the calculated speed $TAS_{perfo}$ is equal to the minimum value from among the measured speed $TAS_{mes}$ and the observed speed $TAS_{obs}$. The aircraft being subjected to a tail wind is generally unfavorable for the performance of the aircraft, in particular during takeoff. Thus, in order to ensure that the situation is safe, i.e. in order to take account of the greatest absolute value of the tail wind to which the aircraft is being subjected, the calculated speed $TAS_{perfo}$ is equal to the algebraic minimum value from among the measured speed $TAS_{mes}$ and the observed speed $TAS_{obs}$, when at least one of the measured speed $TAS_{mes}$ and the observed speed $TAS_{obs}$ is negative.

A first instability criterion is generally characterized by the aerodrome concerned issuing a special bulletin over the associated radio frequency or else by a special report, e.g. in the context of a METAR report.

In order to obtain the first instability criterion for the local wind, it is possible in the method of the invention to extract it automatically from the digital data received by the means for receiving weather observation and weather forecast information and in particular from the weather observation information. This first instability criterion for the local wind may correspond, for example, to a special report being issued.

In contrast, when the means for receiving the weather observation and weather forecast information is a radio, a pilot or some other member of the aircraft crew needs to take account of the first instability criterion for the local wind corresponding to a special bulletin that has been issued.

In order to obtain the second instability criterion for the local wind, it is possible in the method of the invention to extract it automatically from the digital data received by the means for receiving the weather observation and weather forecast information, and in particular from the weather forecast information, after previously automatically decoding that weather forecast information. In the context of a TAF report, this second instability criterion is the presence in the forecast information of at least one indicator such as "BECMG", "TEMPO", or "VRB" specifying forecast instability in the local wind.

In contrast, when the means for receiving weather observation and weather forecast information is a radio, a pilot or some other member of the aircraft crew needs to take account of this second instability criterion for local wind as characterized by the presence of one of these indicators in the weather forecast information.

The aircraft also has display means, such as a display screen, for example. During the method of the invention for determining the wind speed to be taken into account when determining the maximum authorized takeoff weight of an aircraft, it is thus possible to display on the display means the calculated speed $TAS_{perfo}$ of the local wind that is for use in determining the maximum authorized takeoff weight of the aircraft.

Furthermore, during the method of the invention, it is also possible in conventional manner to calculate this maximum authorized takeoff weight of the aircraft as a function of the calculated speed $TAS_{perfo}$ of the local wind, and then to display it on the display means. This maximum authorized takeoff weight of the aircraft is defined in particular using charts provided by the manufacturer of the aircraft.

As a result, the method of the invention makes it possible firstly to determine a wind speed for taking into account when calculating the maximum authorized takeoff weight of the aircraft that is as great as possible depending on weather conditions, while not degrading safety requirements, and secondly to determine the maximum authorized takeoff weight.

Advantageously, the method enables the measurements of the local wind speed from onboard anemometer means to be consolidated with weather observations and forecasts, thereby making it possible, if weather conditions are stable and favorable, to increase the takeoff capacity of the aircraft.

Furthermore, the method of the invention is preferably for use by a rotary wing aircraft. A rotary wing aircraft has at least one main rotor and possibly also a tail rotor.

Each anemometer means may be positioned on the aircraft so that each current speed value $TAS_{inst}$ of the local wind speed is measured in a first zone that is not disturbed by the main rotor or by the tail rotor. Nevertheless, this first zone is positioned so that each current speed value $TAS_{inst}$ is representative of air flow around the aircraft.

Any anemometer measurement means may also be positioned on the aircraft in a second zone that is disturbed by the main rotor or by the tail rotor. Each current speed value $TAS_{inst}$ is then corrected in order to take account of the disturbances caused by the main rotor and/or by the tail rotor and thus be representative of the air flow that genuinely exists around the aircraft.

Anemometer means may be positioned in the immediate environment of the aircraft, at the top of a tail fin of the aircraft or indeed on top of a mast of the main rotor of the aircraft, for example.

Furthermore, in order to enable the pilot of the aircraft to have full knowledge of the situation, the method of the invention may also display intermediate data as calculated by the method on the display means, which data may comprise, for example:

the mean measured speed $TAS_{moy}$ of the local wind;
the mean direction of the local wind;
the mean observed speed of the local wind;
the mean observed direction of the local wind; and
variations in the mean observed speed and in the mean observed direction of the wind.

The present invention also provides a device for determining the wind speed to be taken into account when determining the maximum authorized takeoff weight of an aircraft, which device is capable of performing the above-described method. Such a device comprises at least:

anemometer means for measuring the local wind speed at the aircraft;

receiver means for receiving weather observation forecast information for the proximity of the aircraft;

consolidation means including at least a computer and storage means; and display means.

Such a device may also include heading determination means for determining the heading of the aircraft and/or locating means.

The device is intended more particularly for fitting on board a rotary wing aircraft having at least one main rotor and possibly a tail rotor.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which.

Elements present in more than one of the figures are given the same references in each of them.

DETAILED DESCRIPTION OF THE INVENTION

Figure 1:
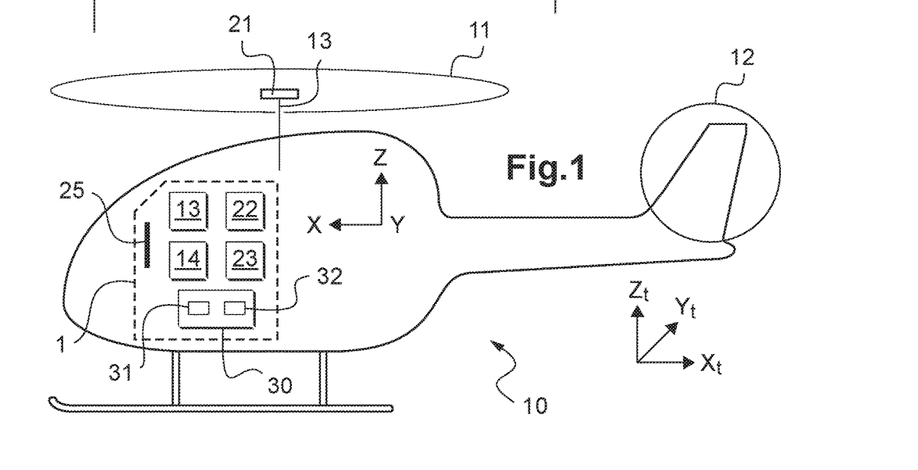
FIG. 1 shows an aircraft fitted with a device of the invention.

In FIG. 1, there can be seen an aircraft 10 that has a main rotor 11 located above a fuselage and an anti-torque tail rotor 12 that is positioned at the rear end of a tail boom.

A local reference frame (X, Y, Z) is associated with the aircraft 10, and more particularly with its center of gravity. The longitudinally extending direction of the aircraft 10 corresponds to the axis X and extends from the front of the aircraft 10 towards the rear of the aircraft 10. A vertically extending direction of the aircraft 10 corresponds to the axis Z and extends upwards perpendicularly to the longitudinal direction X. Finally, a transversely extending direction of the aircraft 10 corresponds to the axis Y and extends from right to left perpendicularly to the longitudinal direction X and the direction in elevation Z.

The longitudinal direction X is the roll axis of the aircraft 10, the transverse direction Y is its pitching axis, and the direction in elevation Z is its yaw axis.

The aircraft 10 also has a device 1 for determining the wind speed to be taken into account for determining the maximum authorized takeoff weight of the aircraft 10.

The device 1 comprises anemometer means 21 positioned above a mast 13 of the main rotor 11. The anemometer means 21 may for example be an optical anemometer such as a LIDAR anemometer using a laser beam. It serves to measure the magnitude and the direction of the air speed of the aircraft 10 in a local reference frame, e.g. the reference frame (X, Y, Z), and to do so in accurate and of integrity. The anemometer means 21 serve in particular to determine the longitudinal speed and the transverse speed of the local wind at the aircraft 10, while the aircraft 10 is stationary.

The device 1 is also provided with first receiver means 22 for receiving weather observation information and second receiver means 23 for receiving weather forecast information. Each receiver means 22, 23 can receive weather observation or weather forecast information in digital form, e.g. coming from the aerodrome where the aircraft 10 is situated while waiting to take off. The observation information may for example be taken from a METAR report and the forecast information may be taken from a TAF report.

The device 1 also has means 13 for determining the heading of the aircraft 10, such as AHRS device and locating means 14 such as a GNSS receiver for determining the instantaneous position, attitude, and heading of the aircraft 10 in a terrestrial reference frame $(X_t, Y_t, Z_t)$, and also a current time.

The device 1 also has consolidation means 30 comprising a computer 31 and storage means 32.

The storage means 32 can store information received by the receiver means 22, 23 and by the locating means 14, together with measurements taken by the anemometer means 21 and by the heading determination means 13 of the aircraft 10. The storage means 32 may also store instructions that are executed by the computer 31 making use, amongst other things, of the stored information and measurements.

Finally, the device 1 includes display means 25 such as a display screen for displaying information for the pilot and/or some other member of the crew of the aircraft 10.

Figure 2:
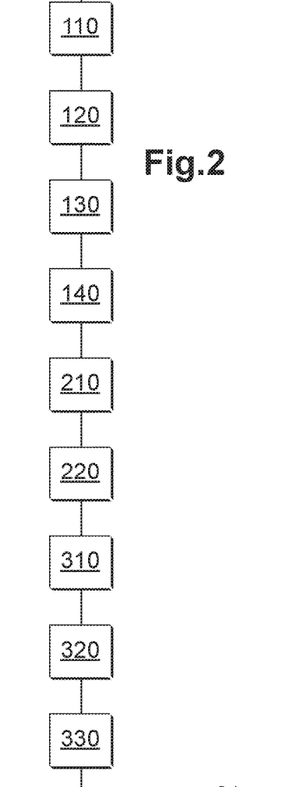
FIGS. 2 and 3 are two block diagrams showing two implementations of the method of the invention.
Figure 3:
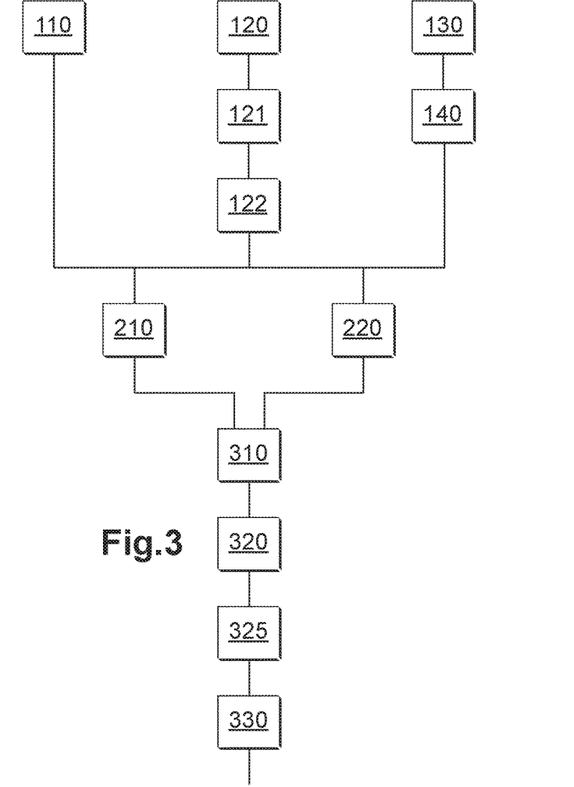

FIGS. 2 and 3 show two implementations of a method of determining the wind speed that is to be taken into account when determining the maximum authorized takeoff weight of an aircraft 10. This method makes it possible to determine the greatest possible wind speed for taking into account when determining the maximum authorized takeoff weight, depending on real weather conditions, but without degrading safety requirements, and it also makes it possible to determine the corresponding maximized authorized takeoff weight.

The device 1 can perform two implementations of the method of determining the wind speed for taking into account when determining the maximum authorized takeoff weight of an aircraft 10.

Thus, in a first step 110, at least a value for the heading is determined in the terrestrial reference frame $(X_t, Y_t, Z_t)$.

This value for the heading may be obtained by the heading determination means 13 and it then corresponds to the instantaneous heading of the aircraft 10.

This value for the heading may also be defined manually by a pilot or indeed some other crew member of the aircraft. This value for the heading may then be equal to the instantaneous heading of the aircraft 10, or it may be different therefrom, e.g. corresponding to the takeoff heading that the aircraft 10 is going to adopt very quickly after taking off.

This value for the heading makes it possible to define a predefined direction that is characterized in the terrestrial reference frame $(X_t, Y_t, Z_t)$.

When the value for the heading is equal to the instantaneous heading of the aircraft 10, the predefined direction coincides with the longitudinally extending direction of the aircraft 10.

In contrast, when the value for the heading is different from the instantaneous heading of the aircraft 10, the predefined direction is at an angle relative to the longitudinally extending direction of the aircraft 10, this angle corresponding to the relative bearing of the predefined direction. The instantaneous heading of the aircraft must then also be known in order to be able to calculate the bearing of the predefined direction relative to the longitudinally extending direction of the aircraft.

During a second step 120, at least one current speed value $TAS_{inst}$ is measured for the speed of the local wind by means of the anemometer means 21, this local wind being characterized by a longitudinal component and by a transverse component.

During a third step 130, the weather observation information and the weather forecast information for the area where the aircraft 10 is situated or for a nearby area is received by the receiver means 22, 23.

Thereafter, during a fourth step 140, the weather observation information is decoded in order to extract a mean observed speed for the local wind and the mean observed direction of the local wind together with a first instability criterion for the local observed wind. During this fourth step 140, the weather forecast information is also decoded in order to extract a second instability criterion for the forecast local wind.

Thereafter, during a fifth step 210, a measured speed $TAS_{mes}$ of the local wind in the predefined direction is calculated from at least a current speed value $TAS_{inst}$ of the local wind by using the consolidation means 30.

During a sixth step 220, an observed speed $TAS_{obs}$ of the local wind in the predefined direction is calculated from the weather observation information and from the value for the heading by the consolidation means 30. For this purpose, the observed speed $TAS_{obs}$ of the local wind in the predefined direction is calculated from the mean observed speed and the mean observed direction of the local wind, and also from the value for the heading.

During a seventh step 310, the measured speed $TAS_{mes}$ is compared with the observed speed $TAS_{obs}$ of the local wind by the consolidation means 30.

During an eighth step 320, a calculated speed $TAS_{perfo}$ for the local wind in the predefined direction is determined by the consolidation means 30 for taking into account when determining the maximum authorized takeoff weight of the aircraft 10.

Finally, during a ninth step 330, the calculated speed $TAS_{perfo}$ of the local wind is displayed on the display means 25.

The first implementation of the method as shown in FIG. 2 is constituted by these steps being chained in sequence.

Nevertheless, it is also possible to perform some of the steps in simultaneous manner. For example, in the second implementation of the method shown in FIG. 3, the first, second, and third steps 110, 120, and 130 can be performed simultaneously. Likewise, the fourth and fifth steps 210 and 220 can be performed simultaneously.

Furthermore, this second implementation of the method also includes intermediate steps.

Thus, after the second step 120, a first intermediate step 121 and a second intermediate step 122 take place. During the first intermediate step 121, each current speed value $TAS_{inst}$ as measured during the second step 120 is corrected by subtracting a determined error margin therefrom. During the second intermediate step 122, a mean measured speed $TAS_{moy}$ of the local wind in the predefined direction is calculated as the mean of the current speed values $TAS_{inst}$ as measured during the second step 120 over a predetermined duration.

Thereafter, during the fifth step 210 of this second implementation of the method, the measured speed $TAS_{mes}$ of the local wind is calculated as being equal to the mean measured speed $TAS_{moy}$ of the local wind over the predetermined duration.

In contrast, during the fifth step 210 of the first implementation of the method, the measured speed $TAS_{mes}$ of the local wind is calculated as being equal to the current speed value $TAS_{inst}$. This measured speed $TAS_{mes}$ of the local wind then corresponds to the instantaneous measured speed of the local wind.

During the seventh step 310, the measured speed $TAS_{mes}$ is compared with the observed speed $TAS_{obs}$ of the local wind, while distinguishing three main situations in which the measured speed $TAS_{mes}$ and the observed speed $TAS_{obs}$ are positive, the measured speed $TAS_{mes}$ being compared with the observed speed $TAS_{obs}$ and the observed speed divided by two, $TAS_{obs}/2$.

Nevertheless, these three circumstances are applicable only when the observed local wind is stable and the forecast local wind is also stable, i.e. providing the first and second instability criteria indicate no instability in the observed local wind and no risk of instability in the forecast local wind.

As a result, during the eighth step 320, the calculated speed $TAS_{perfo}$ of the local wind is calculated using the following conditions relating to each of these three situations.

Firstly, if the first instability criterion and/or second instability criterion indicate(s) instability in the observed local wind or a risk of instability in the forecast local wind, then the calculated speed $TAS_{perfo}$ of the local wind is equal to the observed speed divided by two, i.e. $TAS_{obs}/2$.

Thereafter, if the measured speed $TAS_{mes}$ is greater than or equal to the observed speed $TAS_{obs}$, the calculated speed $TAS_{perfo}$ is equal to the observed speed $TAS_{obs}$.

Furthermore, if the measured speed $TAS_{mes}$ lies strictly between the observed speed $TAS_{obs}$ and the observed speed divided by two, $TAS_{obs}/2$, then the calculated speed $TAS_{perfo}$ is equal to the measured speed $TAS_{mes}$.

Finally, if the measured speed $TAS_{mes}$ is less than or equal to the observed speed divided by two, $TAS_{obs}/2$, then the calculated speed $TAS_{perfo}$ is equal to the observed speed divided by two, $TAS_{obs}/2$.

In addition, if no measured speed $TAS_{mes}$ is provided, the calculated speed $TAS_{perfo}$ is equal to the observed speed divided by two, $TAS_{obs}/2$.

In contrast, when no observed speed $TAS_{obs}$ is available, the calculated speed $TAS_{perfo}$ is equal to the measured speed $TAS_{mes}$ divided by two.

Finally, if no measured speed $TAS_{mes}$ is available and no observed speed $TAS_{obs}$ is available, then the calculated speed $TAS_{perfo}$ is equal to 0 kt.

Furthermore, when the measured speed $TAS_{mes}$ and/or the observed speed $TAS_{obs}$ are negative, the calculated speed $TAS_{perfo}$ is equal to the minimum of the measured speed $TAS_{mes}$ and the observed speed $TAS_{obs}$.

Furthermore, this second implementation of the method includes a third intermediate step 325 that takes place after the eighth step 320. During this third intermediate step 325, the authorized maximum takeoff weight of the aircraft 10 is calculated as a function of the calculated speed $TAS_{perfo}$ of the local wind, e.g. using charts as supplied by the manufacturer of the aircraft 10.

Finally, during the ninth step 330, the calculated speed $TAS_{perfo}$ of the local wind and possibly also the maximum authorized takeoff weight of the aircraft 10 is/are displayed on the display means 25. Other information that might be of interest to the pilot may also be displayed, such as the mean measured speed and the mean direction of the local wind together with the mean speed and the mean direction of the observed local wind and any variations therein.

These two implementations of the method of determining the longitudinal speed of the wind to be taken into account when determining the maximum authorized takeoff weight of an aircraft 10 thus make it possible to consolidate local wind measurements from an onboard anemometer that is accurate and of integrity with weather observations and forecasts, so that if weather conditions are stable and favorable, it is possible to optimize the takeoff capacity of the aircraft.

Furthermore, when the value for the heading is different from the instantaneous heading of the aircraft 10 prior to takeoff and defines a takeoff heading value, it is advantageous to calculate the maximum authorized takeoff weight of the aircraft 10 with the wind speed to which the aircraft is subjected when using that takeoff heading value. The method of the invention must then be applied by using as the value for the heading the value of the takeoff heading that corresponds to the heading that the aircraft 10 will quickly take on while taking off. This takeoff heading value needs to be defined manually by the pilot.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of determining the speed of the wind that is to be taken into account when determining the maximum authorized takeoff weight of an aircraft, the aircraft waiting to take off, and including at least:
- anemometer means;
- receiver means for receiving observation information and weather forecast information;
- consolidation means; and
- display means;

the method comprising the following steps:
- determining a heading value in a terrestrial reference frame;
- measuring at least one current speed value $TAS_{inst}$ of the local wind in a predefined direction, the predefined direction being a direction corresponding to the heading value;
- receiving weather observation information and weather forecast information for the area in which the aircraft is situated or for a nearby area;
- calculating a measured speed $TAS_{mes}$ of the local wind in the predefined direction from at least one current speed value $TAS_{inst}$ of the speed of the local wind;
- calculating an observed speed $TAS_{obs}$ of the local wind in the predefined direction from the weather observation information and the heading value;
- comparing the measured value $TAS_{mes}$ and the observed speed $TAS_{obs}$ of the local wind;
- determining a calculated speed $TAS_{perfo}$ of the local wind for taking into account when determining the authorized maximum takeoff weight of the aircraft in the predefined direction; and
- displaying the calculated speed $TAS_{perfo}$ of the local wind on display means.

2. A method according to claim 1, wherein the measured speed $TAS_{mes}$ of the local wind is equal to the current speed value $TAS_{inst}$.

3. A method according to claim 1, wherein at least two current speed values $TAS_{inst}$ are measured over a predetermined duration, and a mean measured speed $TAS_{moy}$ of the local wind in the predefined direction is measured from the current speed values $TAS_{inst}$ measured over the predetermined duration, the mean measured speed $TAS_{moy}$ being equal to the mean of the current speed values $TAS_{inst}$, the measured speed $TAS_{mes}$ of the local wind being equal to the mean measured speed $TAS_{moy}$.

4. A method according to claim 3, wherein the predetermined duration is equal to 2 min.

5. A method according to claim 1, wherein the heading value is determined by a pilot of the aircraft, the instantaneous heading of the aircraft also being determined when the heading value is different from the instantaneous heading of the aircraft in order to calculate a bearing of the predefined direction relative to a longitudinally extending direction of the aircraft extending between the front and the rear of the aircraft.

6. A method according to claim 1, wherein the aircraft has means for determining the heading of the aircraft, the heading value is equal to the instantaneous heading of the aircraft as determined by the means for determining the heading of the aircraft, the predefined direction then being a longitudinally extending direction of the aircraft extending from the front to the rear of the aircraft.

7. A method according to claim 1, wherein the weather observation information is decoded and a mean observed speed of the local wind and an observed direction of the local wind together with a first instability criterion for the local wind are extracted from the observation information, and then the observed speed $TAS_{obs}$ of the local wind in the predefined direction is calculated from the mean observed speed, from the mean observed direction of the local wind, and from the heading value.

8. A method according to claim 7, wherein the weather forecast information is decoded and a second criterion for instability of the local wind is extracted from the forecast information.

9. A method according to claim 8, wherein when the measured speed $TAS_{mes}$ and the observed speed $TAS_{obs}$ are positive, a speed of the local wind in the predefined direction is considered to be positive when the local wind constitutes at least in part a head wind relative to the aircraft; and
- if the first instability criterion and/or the second instability criterion for the local wind indicate(s) instability of the local wind, the calculated speed $TAS_{perfo}$ of the local wind is equal to the observed speed divided by two, $TAS_{obs}/2$;
- if the measured speed $TAS_{mes}$ is greater than or equal to the observed speed $TAS_{obs}$ and if the first instability criterion and the second instability criterion for the local wind do not indicate any instability of the local wind, the calculated speed $TAS_{perfo}$ is equal to the observed speed $TAS_{obs}$;
- if the measured speed $TAS_{mes}$ lies strictly between the observed speed $TAS_{obs}$ and the observed speed divided by two, $TAS_{obs}/2$, and if the first instability criterion and the second instability criterion for the local wind do not indicate any instability of the local wind, the calculated speed $TAS_{perfo}$ is equal to the measured speed $TAS_{mes}$;
- if the measured speed $TAS_{mes}$ is less than or equal to the observed speed divided by two, $TAS_{obs}/2$, and if the first instability criterion and the second instability criterion for the local wind do not indicate any instability of the local wind, the calculated speed $TAS_{perfo}$ is equal to the observed speed divided by two, $TAS_{obs}/2$;
- if no measured speed $TAS_{mes}$ is provided and if the first instability criterion and the second instability criterion for the local wind do not indicate any instability of the local wind, the calculated speed $TAS_{perfo}$ is equal to the observed speed divided by two, $TAS_{obs}/2$; and
- if no observed speed $TAS_{obs}$ is available and if the first instability criterion and the second instability criterion for the local wind do not indicate any instability of the local wind, the calculated speed $TAS_{perfo}$ is equal to the measured speed $TAS_{mes}$ divided by two.

10. A method according to claim 1, wherein when the measured speed $TAS_{mes}$ and/or the observed speed $TAS_{obs}$ are negative, a speed of the local wind in the predefined direction being considered as being negative when the local wind constitutes at least in part a tail wind relative to the aircraft, the calculated speed $TAS_{perfo}$ is equal to the minimum value from among the measured speed $TAS_{mes}$ and the observed speed $TAS_{obs}$.

11. A method according to claim 1, wherein the aircraft includes locating means, and location information and time information supplied by the locating means is used to determine the observation information and the forecast information that is to be used.

12. A method according to claim 1, wherein a pilot of the aircraft supplies location information for the aircraft and time information in order to determine the observation information and the forecast information for use.

13. A method according to claim 1, wherein the observation information and the forecast information come from reports containing digital data corresponding to the position of the aircraft and to the current time.

14. A method according to claim 1, wherein the observation information comes from a METAR report and the forecast information comes from a TAF report.

15. A method according to claim 1, wherein the aircraft is a rotary wing aircraft having at least a main rotor and possibly a tail rotor, and each current speed value $TAS_{inst}$ is corrected in order to take account of the disturbances caused by the main rotor and/or by the tail rotor on each current speed value $TAS_{inst}$.

16. A method according to claim 1, wherein each current speed value $TAS_{inst}$ is measured in the immediate surroundings of the aircraft.

17. A method according to claim 1, wherein each current speed value $TAS_{inst}$ is corrected with a predetermined error margin.

18. A method according to claim 17, wherein the predetermined error margin is equal to 2 kt.

19. A method according to claim 1, wherein the aircraft has a plurality of anemometer means and each current speed value $TAS_{inst}$ is consolidated by redundancy, by monitoring, or by testing for consistency.

20. A method according to claim 1, wherein each current speed value $TAS_{inst}$ has a non-indicated predefined error probability.

21. A method according to claim 1, wherein the maximized authorized takeoff weight of the aircraft is calculated as a function of the calculated speed $TAS_{perfo}$ for the local wind, and is displayed on the display means.

22. A device for determining the speed of the wind that is to be taken into account when determining the maximum authorized takeoff weight of an aircraft, the device comprising at least:
    anemometer means;
    receiver means for receiving observation information and weather forecast information;
    consolidation means including at least one computer and at least storage means; and
    display means;
    wherein each anemometer means measures at least one current speed value $TAS_{inst}$ of the local wind, each receiver means for receiving weather observation and weather forecast information serves to receive weather observation information and weather forecast information for the area in which the aircraft is situated or for a nearby area, each consolidation means calculates a measured speed $TAS_{mes}$ of the local wind from at least one current speed value $TAS_{inst}$, calculates an observed speed $TAS_{obs}$ of the local wind from the weather observation information and a heading value, compares the measured speed $TAS_{mes}$ with the observed speed $TAS_{obs}$ of the local wind, and then determines a calculated speed $TAS_{perfo}$ of the local wind to be taken into account for determining the maximized authorized takeoff weight of the aircraft, the device performing the method according to claim 1.

* * * * *